(12) United States Patent
Patil et al.

(10) Patent No.: US 12,431,506 B2
(45) Date of Patent: Sep. 30, 2025

(54) ELECTRODE INCLUDING DIMENSION RETAINER FOR SOLID-STATE BATTERY

(71) Applicant: NISSAN NORTH AMERICA, INC., Franklin, TN (US)

(72) Inventors: Sandeep Patil, Farmington Hills, MI (US); Mohammed Hussain Abdul Jabbar, Novi, MI (US); Somayeh Zamani, Novi, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 499 days.

(21) Appl. No.: 18/071,548

(22) Filed: Nov. 29, 2022

(65) Prior Publication Data

US 2024/0178403 A1    May 30, 2024

(51) Int. Cl.
*H01M 4/66* (2006.01)
*H01M 4/02* (2006.01)
*H01M 4/04* (2006.01)
*H01M 4/80* (2006.01)
*H01M 10/0525* (2010.01)

(52) U.S. Cl.
CPC ......... *H01M 4/661* (2013.01); *H01M 4/0404* (2013.01); *H01M 4/808* (2013.01); *H01M 10/0525* (2013.01); *H01M 2004/021* (2013.01)

(58) Field of Classification Search
None
See application file for complete search history.

(56) References Cited

U.S. PATENT DOCUMENTS

| | | | |
|---|---|---|---|
| 2009/0311596 A1 | 12/2009 | Visco et al. | |
| 2020/0313243 A1* | 10/2020 | Nishiyama | H01M 4/74 |
| 2021/0143409 A1* | 5/2021 | Zhamu | H01M 10/36 |
| 2022/0293916 A1* | 9/2022 | Choi | H01M 4/0471 |
| 2022/0393285 A1* | 12/2022 | Yun | H01M 50/231 |
| 2023/0027323 A1* | 1/2023 | Xu | H01M 4/0435 |
| 2023/0085771 A1* | 3/2023 | Lee | H01M 4/0469 |
| | | | 429/217 |
| 2023/0198069 A1* | 6/2023 | Kim | H01M 50/133 |
| | | | 429/163 |
| 2024/0039002 A1* | 2/2024 | Jiang | H01M 4/364 |
| 2024/0145661 A1* | 5/2024 | Park | B23K 26/0622 |
| 2024/0186642 A1* | 6/2024 | Lee | H01M 50/293 |
| 2024/0347692 A1* | 10/2024 | Young | H01M 4/38 |

FOREIGN PATENT DOCUMENTS

| | | |
|---|---|---|
| EP | 4030510 A1 | 7/2022 |
| WO | 2020154552 A1 | 7/2020 |
| WO | 2022086249 A1 | 4/2022 |

* cited by examiner

*Primary Examiner* — Scott J. Chmielecki
(74) *Attorney, Agent, or Firm* — Global IP Counselors, LLP (57) ABSTRACT

An electrode is provided that includes a current collector, at least one column and an electrode material. The at least one column is formed of a foam material. The electrode material is disposed on the current collector and includes an electrode active material. Each of the at least one column is disposed within and extending from a surface of the current collector.

20 Claims, 7 Drawing Sheets

ELECTRODE INCLUDING DIMENSION RETAINER FOR SOLID-STATE BATTERY

BACKGROUND

Field of the Invention

The present invention generally relates to an electrode including a dimension retainer for a solid-state battery, and a solid-state battery including the electrode with the dimension retainer. The electrode includes a current collector, at least one column, and an electrode material comprising an electrode active material. The at least one column is formed of a foam material, and the electrode material is disposed on the current collector. Each of the at least one column is disposed within and extending from a surface of the current collector.

Background Information

Lithium-based batteries that include lithium metal anodes or lithium-based cathode material are desirable because they have a high energy density and, thus, can generate a large amount of power with a relatively thin electrode structure, thus permitting a reduction in the size of the battery as compared with other conventional batteries including anodes made of carbon or silicon. Lithium-based batteries use lithium metal anodes and cathodes formed of complex oxides such as lithium nickel manganese cobalt oxide (LiNiMnCoO$_2$, also commonly referred to as "NMC"). However, there are several drawbacks with lithium metal anodes. For example, the performance of lithium metal anodes is limited by current density as such anodes are prone to excessive dendritic growth and accumulation of dead lithium resulting in severe volume expansion of lithium metal anodes in the battery.

In order to improve the safety and energy storage capacity of lithium-based batteries, solid-state batteries have been developed that use a solid or polymer electrolyte to conduct lithium ions between the anode and cathode. Solid-state batteries allow for a much smaller battery size due to their improved energy density. Solid state lithium-based batteries also have an improved safety performance, an enhanced life cycle and higher charge/discharge rates as compared with conventional lithium-ion batteries using a liquid electrolyte, which can lead to undesirable dendrite formation and short-circuiting.

With respect to solid-state lithium-ion batteries, it has been discovered that anode-free solid-state batteries, in which a bare anode current collector is used and a lithium metal anode is formed on the current collector during charging of the battery, have the highest energy density and are therefore the most desirable. For example, conventional anode-free lithium-based solid-state batteries use a cathode formed of a lithium-ion material, such as lithium nickel manganese cobalt oxide (NMC), mixed with solid electrolyte, and a bare anode current collector. In such anode-free batteries, there is no lithium present initially—instead, the lithium metal anode is formed by precipitation from the intercalated lithium in the cathode active material. However, one problem with these conventional anode-free batteries is that they typically have an approximately 30 μm change in expansion or thickness, i.e., a 4-10% change in overall thickness, during charging due to formation of the anode.

Even when a solid-state battery is used that includes an anode initially, expansion and contraction of the battery can also be caused by lithium intercalation of the anode active material(s), for example carbon host materials, or by an increase in the volume of the electrode due to irreversible reaction deposits. Expansion and contraction can also be caused by dead volume and pressure changes within the cell case due to the battery structure and construction.

These dimensional changes in the battery due to expansion and contraction can impact the operation of the battery, the stacking of the battery cells in the final module, and the system integration. The expansion and contraction of the battery can also cause contact issues between the battery layers, thereby reducing the cycle life of the battery. Some conventional solid-state batteries have attempted to use high pressure to reduce the change in expansion. Alternatively, other solid-state batteries have included a protective polymer layer between the anode and the solid electrolyte layer.

However, there are several drawbacks with conventional protective polymer layers for lithium-ion solid-state batteries. For example, the polymer material can reduce the conductivity of the electrode materials and undesirably react with the solid electrolyte material. Furthermore, addition of the polymer material between the active material layers can reduce the energy density of the battery. The protective polymer layer also fails to sufficiently accommodate the 4-10% change in the dimensions of the battery.

Therefore, further improvement is needed to sufficiently accommodate the dimensional changes in solid-state batteries during charging and discharging. In particular, it is desirable to compensate for the expansion and pressure increase in the battery during charging and thereby prevent any contact issues between the layers after the discharge step when the anode layer goes away.

SUMMARY

It has been discovered that the dimensional changes in the battery during charging and discharging can be compensated for by providing column(s) extending from a surface of one or both of the electrode current collectors. The columns can be provided on one or both of the electrode current collectors and are formed of a foam or cushion material. The columns are provided within cavities of the current collector and extend from those cavities throughout the electrode. By providing the foam cushion columns on one or both of the current collectors, the volume changes in the solid-state battery can be reduced from approximately 4-10% to 1-2% because the foam cushion absorbs the pressure increase and acts as a spring that can contract under pressure, for example when an anode is formed during charging, and can re-expand when the pressure is reduced, for example, when the lithium metal anode disappears during discharging. In addition, the foam cushion can absorb the decomposed species in the battery. Furthermore, the foam cushion has a porosity of at least 80% and is stable in lithium such that it can withstand several cycles without degradation.

Therefore, it is desirable to provide a lithium-ion battery, such as an all-solid-state battery, that includes such an electrode in which foam cushion columns are provided within and extending from a surface of the current collector.

In view of the state of the known technology, one aspect of the present disclosure is to provide an electrode having a foam cushion. The electrode includes a current collector, at least one column formed of a foam material, and an electrode material. The electrode material is disposed on the current collector, and the electrode material comprises an electrode active material. Each of the at least one column is disposed within and extending from a surface of the current collector. By providing the at least one column extending from the current collector, volume changes in the battery during charging and discharging can be reduced as compared with conventional solid-state batteries.

Another aspect of the present disclosure is to provide a battery including an electrode having a foam cushion. The battery includes a cathode, an anode and an electrolyte disposed between the cathode and the anode. At least one of the anode and the cathode includes a current collector, at least one column formed of a foam material, and an electrode material. The electrode material is disposed on the current collector, and the electrode material comprises an electrode active material. Each of the at least one column is disposed within and extending from a surface of the current collector.

A further aspect of the present disclosure is to provide a method of forming an electrode having a foam cushion. The method includes forming at least one cavity in a surface of a current collector, applying a precursor material in each of the at least one cavity, growing the precursor material in each of the at least one cavity, and forming an electrode active material on the surface of the current collector. The precursor material is grown to a column that extends a prescribed height above the surface of the current collector, and the column is formed of a foam material.

By providing the columns formed of foam material extending from a surface of the current collector, the pressure increase and decrease during charging and discharging of the solid-state battery can be accommodated. Thus, the foam columns act as a dimension retainer on one or both of the electrodes to thereby reduce the volume change in the battery during cycling. Furthermore, by providing the foam columns within the surface of the current collector, for example, within cavities formed in the current collector, the foam columns are more firmly and stably secured to the current collector such that they are not displaced during cycling.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1A:
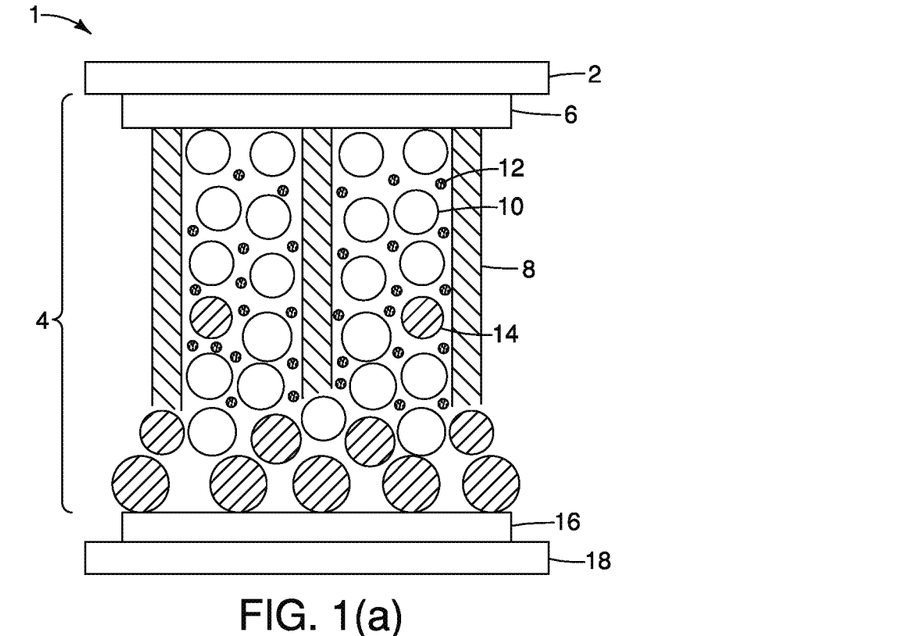
FIG. 1(a) is a cross sectional view of a solid-state battery before charging according to a first embodiment.

Referring initially to FIG. 1(a), a solid-state battery 1 is illustrated before charging in accordance with a first embodiment. The solid-state battery 1 includes a first metal support 2, a cathode 4, an electrolyte 16, and a second metal support 18. The solid-state battery 1 can be incorporated in a vehicle, a mobile device, a laptop computer or other suitable personal electronic device. The solid-state battery 1 is preferably an all-solid-state battery.

The first metal support 2 is formed of any suitable metal material, such as aluminum or copper, preferably aluminum. The first metal support 2 has a thickness ranging from 60 µm to 100 µm, preferably 60 µm. The first metal support 2 has a circular shape, but it should be understood that the first metal support 2 may have any suitable shape, such as a square or rectangular shape.

As shown in FIG. 1(a), the cathode 4 includes a cathode current collector 6, a plurality of columns 8 extending from the bottom surface of the cathode current collector 6, catholyte particles 10, additive particles 12, and cathode active material particles 14. The cathode current collector 6 is formed of any suitable metal material, such as aluminum or copper, preferably aluminum. The cathode current collector 6 has a thickness ranging from 60 µm to 100 µm, preferably 60 µm.

The columns 8 are formed within and extending from the bottom surface of the cathode current collector 6. The columns 8 are spaced apart from each other and may be formed in any suitable pattern, as long as the columns 8 cover approximately 20-30% of the surface area of the cathode current collector 6, preferably 25% of the surface area of the cathode current collector 6. The columns 8 are preferably formed in a pattern such that they do not cover a central area of the bottom surface of the cathode current collector 6. The columns 8 are also preferably formed in a pie-shaped pattern or a circular pattern.

Each of the columns 8 has a same prescribed diameter and length extending from a first end within the bottom surface of the cathode current collector 6 to an opposite end Preferably, each of the columns 8 has a prescribed length of at least 75% of the total thickness of the cathode 4. In this embodiment, the columns 8 do not extend throughout the entire thickness of the cathode 4 such that they are in contact with the electrolyte 16. However, it should be understood that the columns 8 may extend throughout the entire thickness of the cathode 4 and be in contact with the electrolyte 16. Furthermore, it should be understood that the columns 8 may have different lengths extending from the first end within the bottom surface of the cathode current collector 6 to the opposite end, as long as each of the columns 8 has a prescribed length of at least 75% of the total thickness of the cathode 4. Each of the columns 8 has a prescribed length of 10 μm to 30 μm, preferably 20 μm, and a prescribed diameter of approximately 1 μm to 5 μm, preferably 3 μm.

The columns 8 are formed of a foam material. The foam material may be any suitable foam material that acts as a cushion. For example, the foam material has a porosity of 80% or more, is stable in lithium, and can withstand several cycles without degradation. The foam material is preferably formed of polystyrene, polyurethane, glass wool, or a mixture thereof.

The columns 8 may be formed in the cathode current collector 6 in any suitable manner, for example using a laser to perform laser etching and form cavities in the cathode current collector 6 and filling the cavities with the foam material or a precursor for the foam material.

The catholyte particles 10 are formed of any suitable catholyte material for a solid-state battery. For example, the catholyte material may be any suitable lithium-ion conductive solid electrolyte material. In particular, the catholyte material can be a sulfide-based solid electrolyte, such as $Li_6PS_5Cl$, an oxide solid electrolyte, or a hybrid solid electrolyte that includes a sulfide-based solid electrolyte and a polyethylene oxide ("PEO") based polymer. The catholyte particles 10 have a size ranging from approximately 100 nm to 5 μm.

The additive particles 12 are formed of any suitable electrically conductive additive. For example, the electrically conductive additive can be a carbon material. The electrically conductive additive is preferably a carbon black material or a carbon nanofiber. The additive particles 12 have a size of approximately 30 nm to 0.5 μm and a surface area of approximately 5 $m^2/g$ to 100 $m^2/g$.

The cathode active material particles 14 are formed of any suitable cathode active material that is compatible with a solid electrolyte. For example, the cathode active material may be a lithium transition metal oxide such as NMC or lithium cobalt oxide, lithium phosphate, lithium iron phosphate or a mixture thereof. The cathode active material particles 14 have a diameter of approximately 15 nm to 5 μm.

The cathode 4 includes at least 80 percent by weight of the cathode active material particles 14. The cathode 4 also includes at least fifteen percent by weight of the catholyte particles 10. The cathode 4 may include up to five percent by weight of the additive particles 12. The weight percentage values described above are relative to a total weight of the cathode 4.

The cathode 4 may also optionally contain a binder (not shown). The binder may be any suitable electrode binder material. For example, the binder may include polytetrafluoroethylene, polyvinylidene fluoride, styrene-butadiene rubber, a cellulose material or any combination thereof. The binder is preferably polytetrafluoroethylene. The cathode 4 has a thickness of approximately 10 μm to 150 μm.

The electrolyte 16 is any suitable electrolyte for a solid-state battery, such as a solid electrolyte. The solid electrolyte can be any suitable lithium-ion conductive solid electrolyte. For example, the solid electrolyte can be a sulfide-based solid electrolyte, such as $Li_6PS_5Cl$, an oxide solid electrolyte, or a hybrid solid electrolyte that includes a sulfide-based solid electrolyte and a polyethylene oxide ("PEO") based polymer. The electrolyte 16 has a thickness of approximately 10 μm to 20 μm.

The anode current collector 18 is formed of any suitable metal material, such as aluminum or copper, preferably copper. The anode current collector 18 has a thickness ranging from 60 μm to 100 μm, preferably 60 μm.

The second metal support 20 is formed of any suitable metal material, such as aluminum or copper, preferably aluminum. The second metal support 20 has a thickness ranging from 60 μm to 100 μm, preferably 60 μm. The second metal support 20 has a circular shape, but it should be understood that the second metal support 20 may have any suitable shape, such as a square or rectangular shape.

Figure 1B:
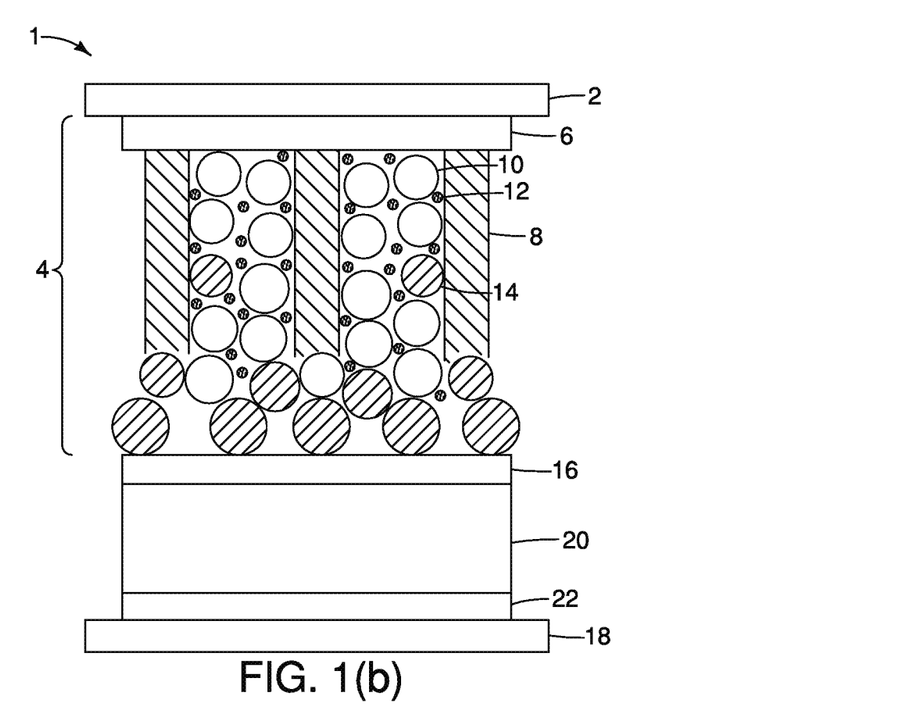
FIG. 1(b) is a cross sectional view of the solid-state battery after charging according to the first embodiment.

As shown in FIG. 1(*b*), the first metal support 2, the cathode current collector 6, the solid electrolyte 16, the anode current collector 18 and the second metal support 20 are all at least substantially the same after charging, i.e., have the same thickness and shape, as before charging.

However, after charging, the columns 8 are compressed as shown in FIG. 1(*b*) compared to the columns 8 before charging as shown in FIG. 1(*a*). In other words, the columns 8 are shortened while charging and slightly elongated while discharging providing a spring action for the battery assembly, i.e., the electrode/electrolyte.

Although the solid-state battery 1 is anode-free before charging as shown in FIG. 1(*a*), the anode 22 is formed during charging such that it is disposed on the top surface of the anode current collector 18 between the anode current collector 18 and the solid electrolyte 16. The anode 22 is formed during charging by precipitation of lithium from the intercalated lithium in the cathode active material particles 14. Therefore, the anode 22 is formed entirely of lithium metal or a lithium alloy, such as a lithium-silver alloy. The anode 22 has a thickness of approximately 20 μm to 40 μm, preferably 30 μm. The increase in thickness or expansion of the solid-state battery 1 during charging due to formation of the anode 22 is accommodated by providing the columns 8 formed of a foam material having a porosity of 80% or more, which are each compressed during formation of the anode 22.

Figure 2A:
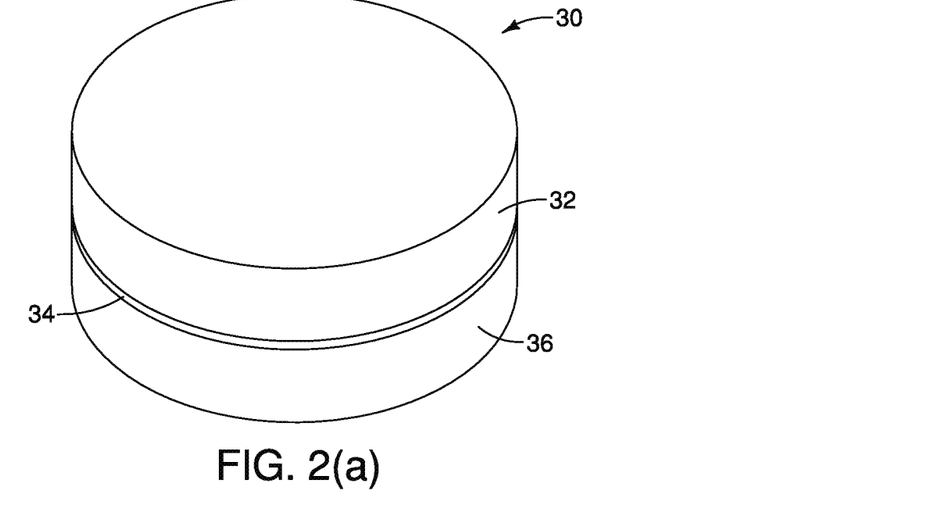
FIG. 2(a) is a perspective view of a solid-state battery according to a second embodiment.
Figure 2B:
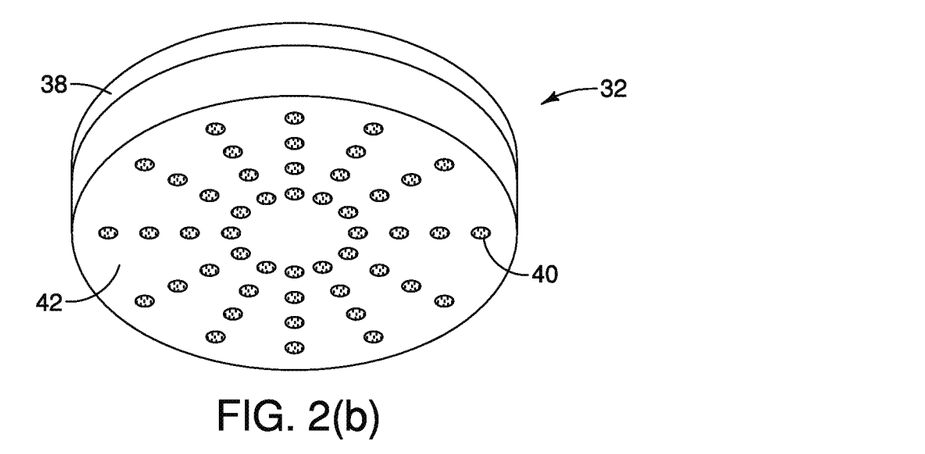
FIG. 2(b) is a bottom perspective view of the cathode of FIG. 2(a)
Figure 2C:
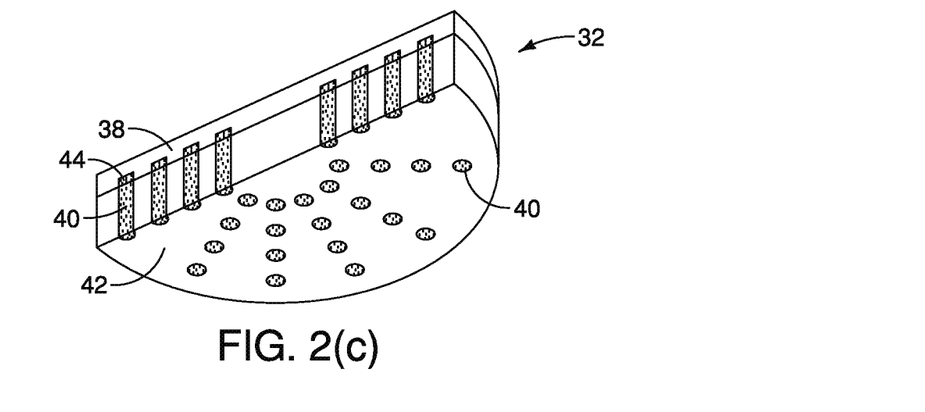
FIG. 2(c) is a partial bottom perspective view of the cathode of FIG. 2(a)

FIGS. 2(*a*)-2(*c*) show a solid-state battery 30 that includes a cathode 32, an electrolyte 34 and an anode 36 in accordance with a second embodiment. Like the solid-state battery 1 of the first embodiment, the solid-state battery 30 is preferably an all-solid-state battery and can be incorporated in a vehicle, a mobile device, a laptop computer or other suitable personal electronic devices.

As shown in FIGS. 2(*b*) and 2(*c*), the cathode 32 includes a cathode current collector 38, a plurality of columns 40 formed within and extending from a bottom surface of the cathode current collector 38, and a cathode material 42 that surrounds the columns 40 so as to form a layer between the cathode current collector 38 and the electrolyte 34. The cathode current collector 38 is formed of any suitable metal material, such as aluminum or copper, preferably aluminum. The cathode current collector 38 has a thickness ranging from 60 μm to 100 μm, preferably 60 μm.

As shown in FIG. 2(*c*), the columns 40 are formed within and extending from cavities 44 in the bottom surface of the cathode current collector 38. The columns 40 are spaced apart from each other and may be formed in any suitable pattern, as long as the columns 40 cover approximately 20-30% of the surface area of the cathode current collector 38, preferably 25% of the surface area of the cathode current collector 38. As shown in FIG. 2(*c*), the columns 40 are formed in a pie-shaped pattern and do not cover a central area of the bottom surface of the cathode current collector 38. However, it should be understood that the columns 40 may be formed in a circular pattern or any other suitable pattern.

The columns 40 are formed of a foam material. The foam material may be any suitable foam material that acts as a cushion. For example, the foam material has a porosity of 80% or more, is stable in lithium, and can withstand several cycles without degradation. The foam material is preferably formed of polystyrene, polyurethane, glass wool, or a mixture thereof.

Each of the columns 40 has a same prescribed diameter and length extending from the cavities 44 within the bottom surface of the cathode current collector 38. In this embodiment, the columns 40 have a same length and extend throughout the entire thickness of the cathode 32 such that they are in contact with the electrolyte 34. However, it should be understood that the columns 40 may have any prescribed length that is at least 75% of the total thickness of the cathode 32. Furthermore, it should be understood that the columns 40 may have different lengths extending from the cavities 44 within the bottom surface of the cathode current collector 38, as long as each of the columns 40 has a prescribed length of at least 75% of the total thickness of the cathode 32. Each of the columns 40 has a prescribed length of 10 μm to 30 μm, preferably 20 μm and a prescribed diameter of approximately 1 μm to 5 μm, preferably 3 μm.

The cavities 44 are formed in the cathode current collector 38 in any suitable manner, for example using a laser to perform laser etching. The foam material is then filled in the cavities and grown to form the columns 40.

The cathode material 42 includes catholyte particles, additive particles and cathode active material particles. The catholyte particles are formed of any suitable catholyte material for a solid-state battery. For example, the catholyte material may be any suitable lithium-ion conductive solid electrolyte material. In particular, the catholyte material can be a sulfide-based solid electrolyte, such as $Li_6PS_5Cl$, an oxide solid electrolyte, or a hybrid solid electrolyte that includes a sulfide-based solid electrolyte and a polyethylene oxide ("PEO") based polymer. The catholyte particles have a size ranging from approximately 100 nm to 5 μm.

The additive particles are formed of any suitable electrically conductive additive. For example, the electrically conductive additive can be a carbon material. The electrically conductive additive is preferably a carbon black material or a carbon nanofiber. The additive particles have a size of approximately 30 nm to 0.5 μm and a surface area of approximately 5 $m^2$/g to 100 $m^2$/g.

The cathode active material particles are formed of any suitable cathode active material that is compatible with a solid electrolyte. For example, the cathode active material may be a lithium transition metal oxide such as NMC or lithium cobalt oxide, lithium phosphate, lithium iron phosphate or a mixture thereof. The cathode active material particles have a diameter of approximately 15 nm to 5 μm.

The cathode material 42 includes at least 80 percent by weight of the cathode active material particles. The cathode material 42 also includes at least fifteen percent by weight of the catholyte particles. The cathode 42 may include up to five percent by weight of the additive particles. The weight percentage values described above are relative to a total weight of the cathode material 42.

The cathode material 42 may also optionally contain a binder (not shown). The binder may be any suitable electrode binder material. For example, the binder may include polytetrafluoroethylene, polyvinylidene fluoride, styrene-butadiene rubber, a cellulose material or any combination thereof. The binder is preferably polytetrafluoroethylene. The cathode material 42 has a thickness of approximately 10 μm to 150 μm.

The electrolyte 34 is any suitable electrolyte for a solid-state battery, such as a solid electrolyte. The solid electrolyte can be any suitable lithium-ion conductive solid electrolyte. For example, the solid electrolyte can be a sulfide-based solid electrolyte, such as $Li_6PS_5Cl$, an oxide solid electrolyte, or a hybrid solid electrolyte that includes a sulfide-based solid electrolyte and a PEO based polymer. The electrolyte 34 has a thickness of approximately 10 μm to 20 μm.

The anode 36 includes an anode material and an anode current collector. The anode material includes an anode active material. The anode material may also include a binder and an additive. The anode active material is any suitable anode active material that is compatible with a solid electrolyte. For example, the anode active material is formed of metal, preferably entirely of metal. The anode active material is preferably formed of lithium, sodium, magnesium, or a mixture thereof. For example, the anode active material may be formed of lithium or a lithium alloy.

The anode material may also include an additive and/or a binder. The anode material includes approximately 90-95 percent by weight of the anode active material and five to ten percent by weight of the additive plus the binder. For example, the anode material may include approximately 95.0 percent by weight of the anode active material, 2.5 percent by weight of the additive and 2.5 percent by weight of the binder.

When a sulfide-based solid electrolyte is used as the electrolyte 34 and the anode material includes lithium metal, a protective layer (not shown) may be also provided between the electrolyte 34 and the anode 36.

The anode current collector is formed of any suitable metal material, such as aluminum or copper, preferably copper. The anode current collector has a thickness ranging from 60 μm to 100 μm, preferably 60 μm.

FIGS. 3(a)-3(e) show a solid-state battery 50 that includes a cathode 52, an electrolyte 54 and an anode 56 in accordance with a third embodiment. Like the solid-state battery 1 of the first embodiment and the solid-state battery 30 of the second embodiment, the solid-state battery 50 is preferably an all-solid-state battery and can be incorporated in a vehicle, a mobile device, a laptop computer or other suitable personal electronic devices.

Figure 3A:
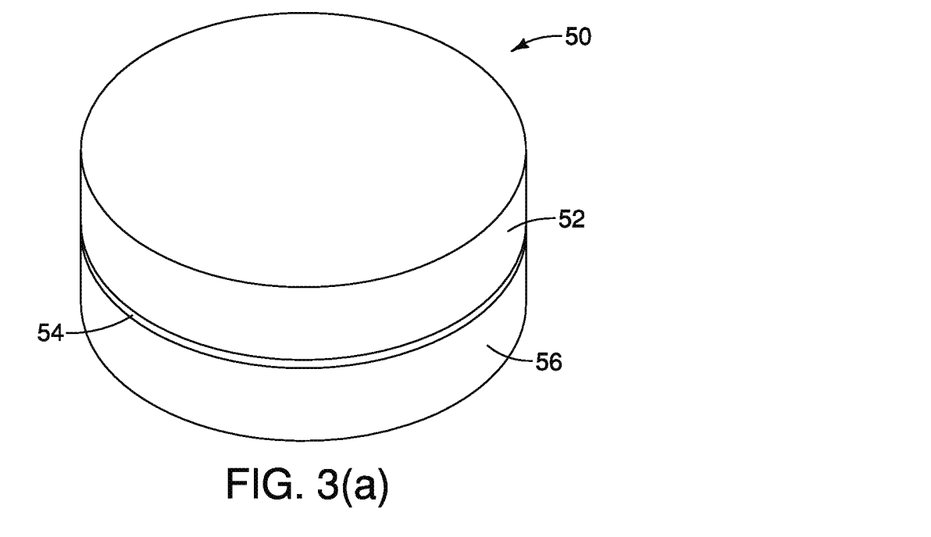
FIG. 3(a) is a perspective view of a solid-state battery according to a third embodiment.
Figure 3B:
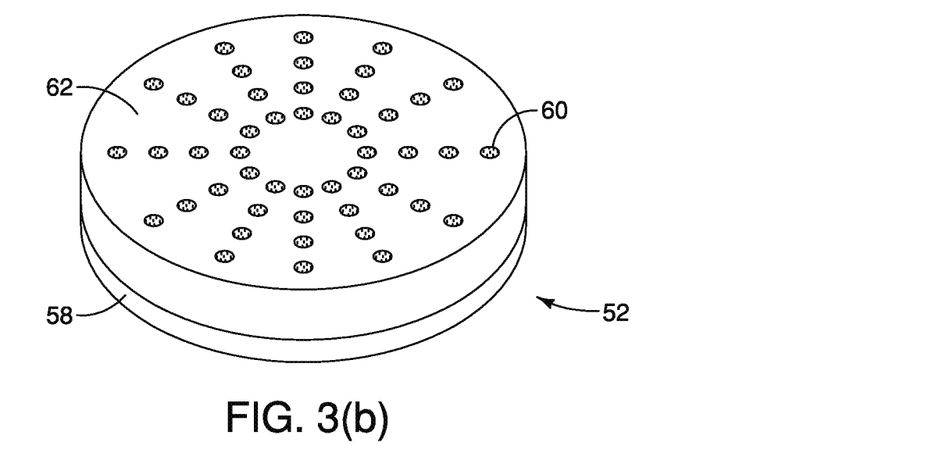
FIG. 3(b) is a bottom perspective view of the cathode of FIG. 3(a)
Figure 3C:
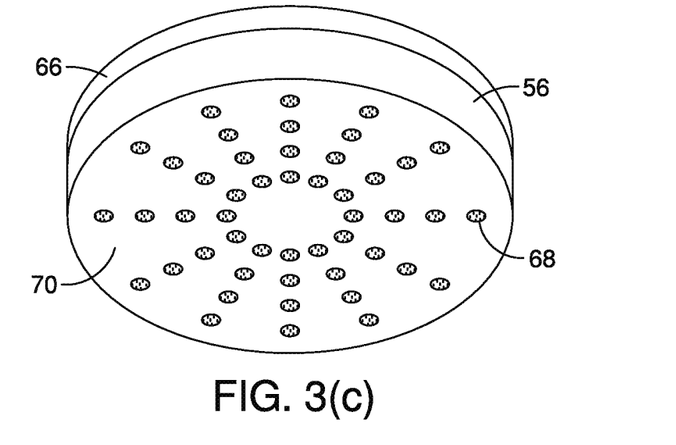
FIG. 3(c) is a top perspective view of the anode of FIG. 3(a)
Figure 3D:
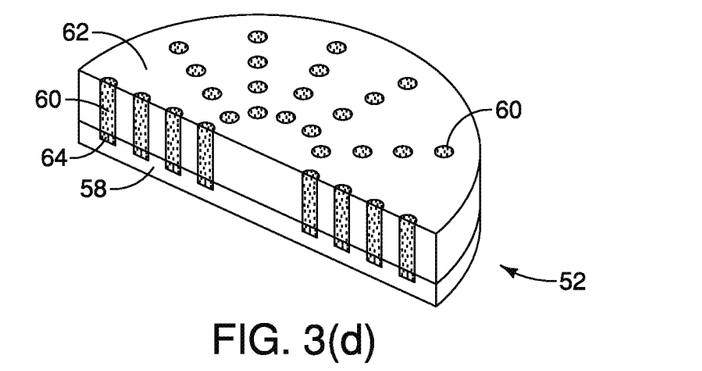
FIG. 3(d) is a partial bottom perspective view of the cathode of FIG. 3(a)

As shown in FIGS. 3(b) and 3(d), the cathode 52 includes a cathode current collector 58, a plurality of columns 60 formed within and extending from a bottom surface of the cathode current collector 58, and a cathode material 62 that surrounds the columns 60 so as to form a layer between the cathode current collector 58 and the electrolyte 54. The cathode current collector 58 is formed of any suitable metal material, such as aluminum or copper, preferably aluminum. The cathode current collector 58 has a thickness ranging from 60 μm to 100 μm, preferably 60 μm.

As shown in FIG. 3(d), the columns 60 are formed within and extending from cavities 64 in the bottom surface of the cathode current collector 58. The columns 60 are spaced apart from each other and may be formed in any suitable pattern, as long as the columns 60 cover approximately 20-30% of the surface area of the cathode current collector 58, preferably 25% of the surface area of the cathode current collector 58. As shown in FIG. 3(d), the columns 60 are formed in a pie-shaped pattern and do not cover a central area of the bottom surface of the cathode current collector 58. However, it should be understood that the columns 60 may be formed in a circular pattern or any other suitable pattern.

The columns 60 are formed of a foam material. The foam material may be any suitable foam material that acts as a cushion. For example, the foam material has a porosity of 80% or more, is stable in lithium, and can withstand several cycles without degradation. The foam material is preferably formed of polystyrene, polyurethane, glass wool, or a mixture thereof.

Each of the columns 60 has a same prescribed diameter and length extending from the cavities 64 within the bottom surface of the cathode current collector 58. In this embodiment, the columns 60 have a same length and extend throughout the entire thickness of the cathode 52 such that they are in contact with the electrolyte 54. However, it should be understood that the columns 60 may have any prescribed length that is at least 75% of the total thickness of the cathode 52. Furthermore, it should be understood that the columns 60 may have different lengths extending from the cavities 64 within the bottom surface of the cathode current collector 58, as long as each of the columns 60 has a prescribed length of at least 75% of the total thickness of the cathode 52. Each of the columns 60 has a prescribed length of 10 μm to 30 μm, preferably 20 μm and a prescribed diameter of approximately 1 μm to 5 μm, preferably 3 μm.

The cavities 64 are formed in the cathode current collector 58 in any suitable manner, for example using a laser to perform laser etching. The foam material is then filled in the cavities and grown to form the columns 60.

The cathode material 62 includes catholyte particles, additive particles and cathode active material particles. The catholyte particles are formed of any suitable catholyte material for a solid-state battery, such as a lithium-ion conductive solid electrolyte material. In particular, the catholyte material can be a sulfide-based solid electrolyte, such as $Li_6PS_5Cl$, an oxide solid electrolyte, or a hybrid solid electrolyte that includes a sulfide-based solid electrolyte and a polyethylene oxide ("PEO") based polymer. The catholyte particles have a size ranging from approximately 100 nm to 5 μm.

The additive particles are formed of any suitable electrically conductive additive. For example, the electrically conductive additive can be a carbon material. The electrically conductive additive is preferably a carbon black material or a carbon nanofiber. The additive particles have a size of approximately 30 nm to 0.5 μm and a surface area of approximately 5 $m^2/g$ to 100 $m^2/g$.

The cathode active material particles are formed of any suitable cathode active material that is compatible with a solid electrolyte. For example, the cathode active material may be a lithium transition metal oxide such as NMC or lithium cobalt oxide, lithium phosphate, lithium iron phosphate or a mixture thereof. The cathode active material particles have a diameter of approximately 15 nm to 5 μm.

The cathode material 62 includes at least 80 percent by weight of the cathode active material particles. The cathode material 62 also includes at least fifteen percent by weight of the catholyte particles. The cathode 62 may include up to five percent by weight of the additive particles. The weight percentage values described above are relative to a total weight of the cathode material 62.

The cathode material 62 may also optionally contain a binder (not shown). The binder may be any suitable electrode binder material. For example, the binder may include polytetrafluoroethylene ("PTFE"), polyvinylidene fluoride ("PVDF"), styrene-butadiene rubber ("SBR"), a cellulose material or any combination thereof. The binder is preferably PTFE. The cathode material 42 has a thickness of approximately 10 μm to 150 μm.

The electrolyte 54 is any suitable electrolyte for a solid-state battery, such as a solid electrolyte. The solid electrolyte can be any suitable lithium-ion conductive solid electrolyte. For example, the solid electrolyte can be a sulfide-based solid electrolyte, such as $Li_6PS_5Cl$, an oxide solid electrolyte, or a hybrid solid electrolyte that includes a sulfide-based solid electrolyte and a PEO based polymer. The electrolyte 54 has a thickness of approximately 10 μm to 20 μm.

Figure 3E:
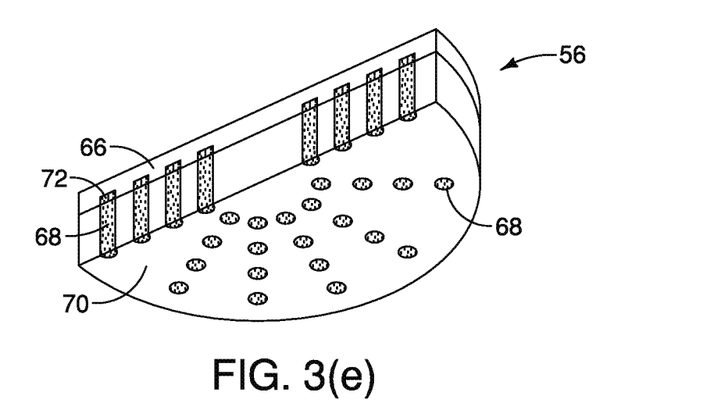
FIG. 3(e) is a partial top perspective view of the anode of FIG. 3(a)

As shown in FIGS. 3(c) and 3(e), the anode 56 includes an anode current collector 66, a plurality of columns 68 formed within and extending from a top surface of the anode current collector 66, and an anode material 70 that surrounds the columns 68 so as to form a layer between the anode current collector 66 and the electrolyte 54. The anode current collector 66 is formed of any suitable metal material, such as aluminum or copper, preferably copper. The anode current collector 66 has a thickness ranging from 60 μm to 100 μm, preferably 60 μm.

As shown in FIG. 3(e), the columns 68 are formed within and extending from cavities 72 in the top surface of the anode current collector 66. The columns 68 are spaced apart from each other and may be formed in any suitable pattern, as long as the columns 68 cover approximately 20-30% of the surface area of the anode current collector 66, preferably 25% of the surface area of the anode current collector 66. As shown in FIG. 3(e), the columns 68 are formed in a pie-shaped pattern and do not cover a central area of the top surface of the anode current collector 66. However, it should be understood that the columns 68 may be formed in a circular pattern or any other suitable pattern.

The columns 68 are formed of a foam material. The foam material may be any suitable foam material that acts as a cushion. For example, the foam material has a porosity of 80% or more, is stable in lithium, and can withstand several cycles without degradation. The foam material is preferably formed of polystyrene, polyurethane, glass wool, or a mixture thereof.

Each of the columns 68 has a same prescribed diameter and length extending from the cavities 72 within the top surface of the anode current collector 66. In this embodiment, the columns 68 have a same length and extend throughout the entire thickness of the anode 56 such that they are in contact with the electrolyte 54. However, it should be understood that the columns 68 may have any prescribed length that is at least 75% of the total thickness of the anode 56. Furthermore, it should be understood that the columns 68 may have different lengths extending from the cavities 72 within the top surface of the anode current collector 66, as long as each of the columns 68 has a prescribed length of at least 75% of the total thickness of the anode 56. Each of the columns 68 has a prescribed length of 10 μm to 30 μm, preferably 20 μm and a prescribed diameter of approximately 1 μm to 5 μm, preferably 3 μm.

The cavities 72 are formed in the anode current collector 66 in any suitable manner, for example using a laser to perform laser etching. The foam material is then filled in the cavities and grown to form the columns 68.

The anode material 70 includes an anode active material. The anode material 70 may also optionally include a binder and an additive. The anode active material is a carbon-based anode active material that is compatible with a solid electrolyte. For example, the anode active material is formed of graphite or nanocarbon. The anode material 70 includes approximately 90-95 percent by weight of the anode active material and five to ten percent by weight of any additive plus any binder. The anode material 70 has a thickness of approximately 20 μm to 40 μm, preferably 30 μm.

The additive is any suitable electrically conductive additive. For example, the additive can be a carbon material, preferably a carbon black material or a carbon nanofiber having a surface area of approximately 5 $m^2$/g to 100 $m^2$/g. The binder may be any suitable electrode binder material. For example, the binder may include PTFE, PVDF, SBR, a cellulose material or any combination thereof. The binder is preferably PVDF.

Figure 4A:
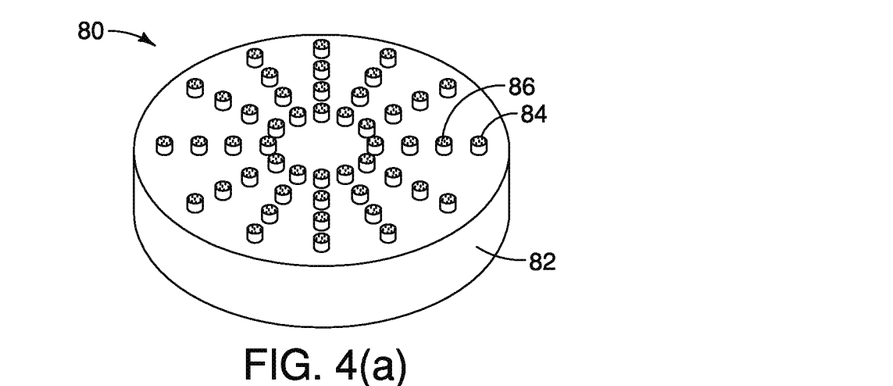
FIG. 4(a) is a perspective view of an electrode at a first time according to a fourth embodiment.

FIG. 4(*a*) shows an electrode 80 for a solid-state battery at a first time in accordance with a fourth embodiment. The electrode 80 includes a current collector 82, a plurality of cavities 84 formed in the surface of the current collector 82, and a foam material 86 formed in the cavities 84 of the current collector 82. The electrode 80 can be used as a cathode or an anode in a solid-state battery, and the solid-state battery can be incorporated in a vehicle, a mobile device, a laptop computer or other suitable personal electronic device.

The current collector 82 is formed of any suitable metal material, such as aluminum or copper. The current collector 82 has a thickness ranging from 60 μm to 100 μm, preferably 60 μm.

The cavities 84 are formed in the current collector 82 in any suitable manner, for example using a laser to perform laser etching. The cavities 84 have a diameter or size of approximately 1 μm to 5 μm, preferably 3 μm, and a depth of approximately 5 μm to 15 μm, preferably 10 μm.

The cavities 84 are filled with a foam material precursor 86. The foam material precursor 86 may be any suitable precursor to form a foam material that acts as a cushion. For example, the foam material precursor may be a polyol.

Figure 4B:
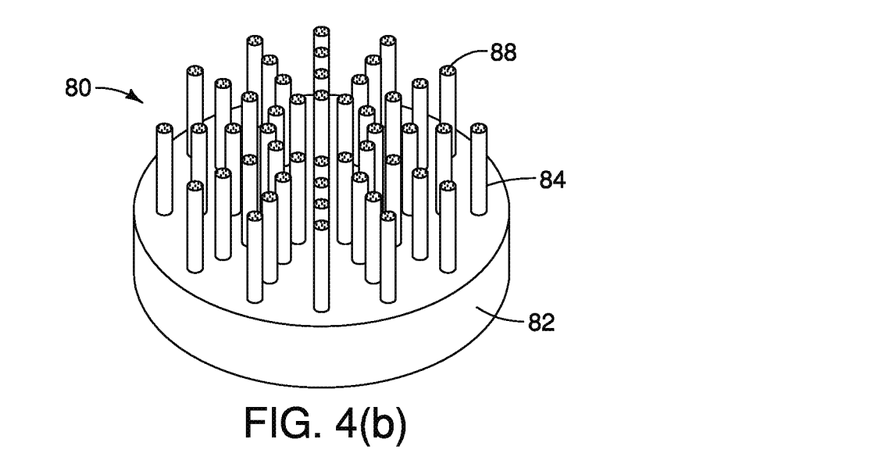
FIG. 4(b) is a perspective view of the electrode at a second time according to the fourth embodiment.

As shown in FIG. 4(*b*), the current collector 82 and the cavities 84 are at least substantially the same, i.e., have the same thickness and shape, at a second, later time, as at the first time shown in FIG. 4(*a*).

However, at the second time, a polyisocyanate material is applied to the foam material precursor 86 to form columns 88 of a foam material having a first height extending from the surface of the current collector 82. The polyisocyanate material reacts with the foam material precursor 86 to form the foam material of the columns 88. The foam material of the columns 88 has a porosity of at least 80% and is preferably a polyurethane material.

Figure 4C:
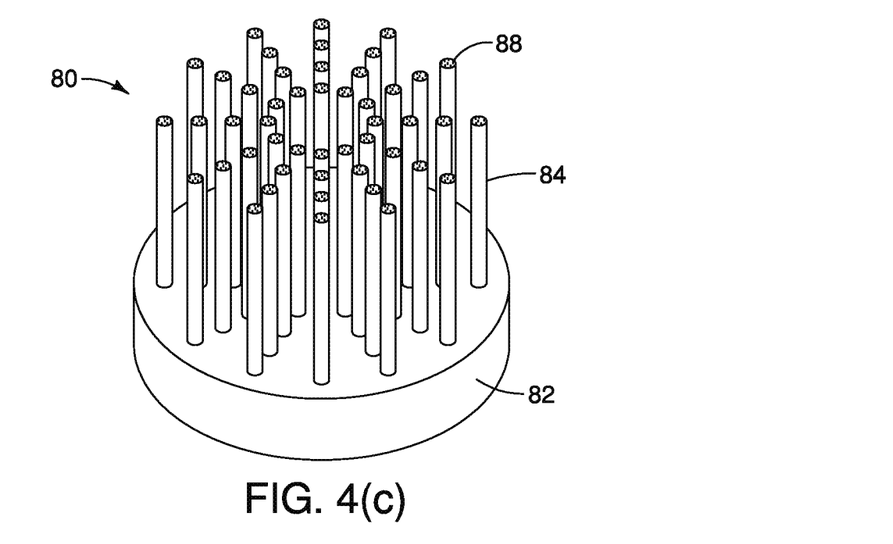
FIG. 4(c) is a perspective view of the electrode at a third time according to the fourth embodiment.

Referring now to FIG. 4(*c*), the current collector 82 and the cavities 84 are at least substantially the same, i.e., have the same thickness and shape, at a third time that is later than the second time. However, at the third time, after the polyisocyanate material has reacted with the foam material precursor material 86 to form the columns 88, the columns 88 are grown to a second height that is greater than the first height extending from the surface of the current collector 82. The second height is 10 μm to 30 μm, preferably 20 μm. This change in the columns 88 after application of the polyisocyanate is due to growth of the foam material after reaction of the polyisocyanate and the polyol. The columns 88 have a diameter of approximately 1 μm to 5 μm, preferably 3 μm.

The volume changes in the solid-state battery can be reduced because the columns 88 formed of the foam material absorb pressure increases during charging and discharging and act as springs that can contract under pressure, for example during charging, and can re-expand when the pressure is reduced, for example during discharging. The foam material has a porosity of at least 80% and is stable in lithium.

Figure 5:
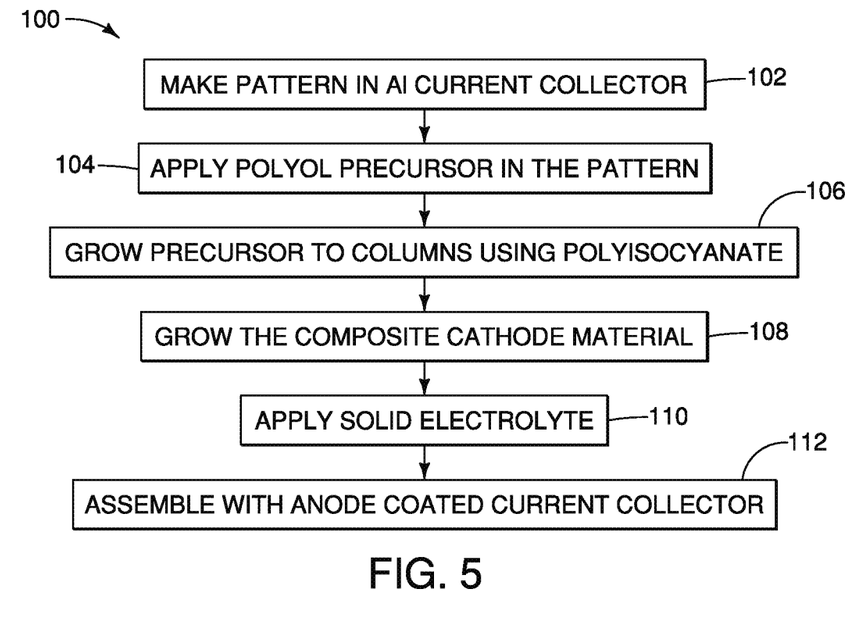
FIG. 5 is an illustrated flow chart showing a method of producing a solid-state battery including an electrode with a dimension retainer according to a fifth embodiment.

FIG. 5 illustrates a process 100 of forming a solid-state battery including an electrode with a dimension retainer according to a fifth embodiment. In Step 102, a pattern is made in a cathode current collector. The cathode current collector is formed of aluminum. However, it should be understood that the cathode current collector may be formed of any suitable metal material, such as aluminum or copper. The cathode current collector has a thickness ranging from 60 μm to 100 μm, preferably 60 μm.

In Step 102, the pattern is formed in the cathode current collector using a laser or stamping method to form a plurality of cavities in the desired pattern in a surface of the cathode current collector. The pattern may be any suitable pattern, as long as the cavities cover approximately 20-30% of the surface area of the cathode current collector, preferably 25% of the surface area of the cathode current collector. The cavities are preferably formed in a pie-shaped pattern and do not cover a central area of the cathode current collector However, it should be understood that the cavities may be formed in a circular pattern or any other suitable pattern.

The pattern is formed such that each of the cavities has a same prescribed depth from the surface of the cathode current collector. For example, each of the cavities is formed to have a prescribed depth of approximately 5 μm to 15 μm, preferably 10 μm. However, it should be understood that the cavities may have different depths from the surface of the cathode current collector.

In Step 104, a polyol precursor is applied or filled in the cavities of the cathode current collector. The polyol precursor may be any suitable polyol material that can be used to form a foam material.

In Step 106, the polyol precursor is grown to columns formed of a foam material using polyisocyanate. In particular, polyisocyanate is applied to the polyol precursor in the cavities of the cathode current collector, and the polyisocyanate reacts with the polyol precursor to form polyurethane. The polyurethane has a porosity of 80% or more. However, it should be understood that any suitable material may be applied in this step, as long as the material reacts with the polyol precursor to form a foam material having a porosity of at least 80%. The columns have a height of 10 μm to 30 μm, preferably 20 μm, and a diameter of approximately 1 μm to 5 μm, preferably 3 μm. The columns have a cylindrical or tubular shape, but it should be understood that the columns may have any suitable shape that gives a cushion or spring effect when the solid-state battery is under pressure.

In Step 108, a composite cathode material is grown on the surface of the cathode current collector having the columns to form a cathode. For example, the composite cathode material may be applied to the surface of the current collector such that the composite cathode material completely surrounds the columns and the cathode material has a thickness that is the same as the height of the columns extending from the surface of the cathode current collector. The composite cathode material includes a cathode active material. The cathode active material is any suitable cathode active material that is compatible with a solid electrolyte. For example, the cathode active material may be a lithium transition metal oxide such as NMC or lithium cobalt oxide, lithium phosphate, lithium iron phosphate or a mixture thereof.

The composite cathode material also includes catholyte particles, an additive and optionally a binder. For example, the cathode material may have a same composition as the cathode material 42 of the second embodiment or the cathode material 62 of the third embodiment. For example, the cathode material includes at least 80 percent by weight of the cathode active material and at least fifteen percent by weight of the catholyte particles. The cathode material also includes up to five percent by weight of the additive plus the binder. For example, the cathode material may include approximately two percent by weight of the additive and approximately three percent by weight of the binder. The weight percentage values described above are relative to a total weight of the cathode material.

In Step 110, a solid electrolyte is applied to the cathode such that the solid electrolyte is in contact with both the composite cathode material and the columns of foam material. The solid electrolyte can be any suitable lithium-ion conductive solid electrolyte. For example, the solid electrolyte can be a sulfide-based solid electrolyte, such as $Li_6PS_5Cl$, an oxide solid electrolyte, or a hybrid solid electrolyte that includes a sulfide-based solid electrolyte and a PEO based polymer. The solid electrolyte is formed to have a thickness of approximately 10 μm to 20 μm.

In Step 112, the cathode and solid electrolyte are assembled with an anode-coated current collector to form the solid-state battery. In particular, the anode-coated current collector is assembled such that the electrolyte is disposed between the cathode and the anode-coated current collector. The anode-coated current collector includes an anode current collector coated with an anode material.

The anode current collector is formed of copper. However, it should be understood that the anode current collector may be formed of any suitable metal material, such as aluminum or copper. The anode current collector has a thickness ranging from 60 μm to 100 μm, preferably 60 μm.

The anode material includes an anode active material. The anode material may also optionally include a binder and an additive. The anode active material is a carbon-based anode active material that is compatible with a solid electrolyte. For example, the anode active material is formed of graphite or nanocarbon. Alternatively, the anode active material is formed of metal, preferably entirely of metal, such as lithium, sodium, magnesium, or a mixture thereof. For example, the anode active material may be lithium or a lithium alloy. The anode active material may also be a silicon-based anode active material. The anode material includes approximately 90-95 percent by weight of the anode active material and five to ten percent by weight of any additive plus any binder. The anode material has a thickness of approximately 20 μm to 40 μm, preferably 30 μm.

The additive is any suitable electrically conductive additive. For example, the additive can be a carbon material, preferably a carbon black material or a carbon nanofiber having a surface area of approximately 5 $m^2$/g to 100 $m^2$/g. The binder may be any suitable electrode binder material. For example, the binder may include PTFE, PVDF, SBR, a cellulose material or any combination thereof. The binder is preferably PVDF.

Like the solid-state battery of the first, second and third embodiments, the solid-state battery of this embodiment is preferably an all-solid-state battery and can be incorporated in a vehicle, a mobile device, a laptop computer or other suitable personal electronic devices.

Figure 6:
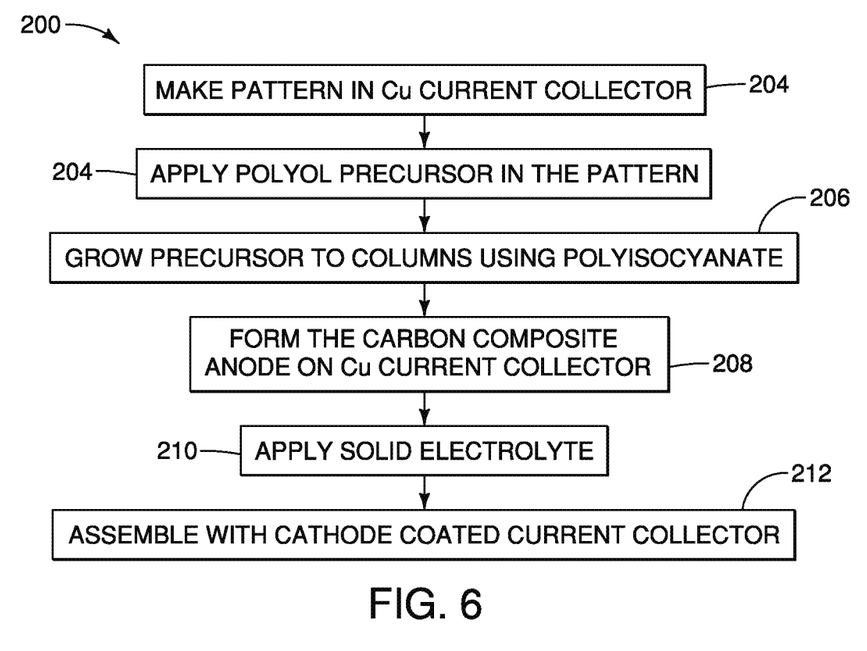
FIG. 6 is an illustrated flow chart showing a method of producing a solid-state battery including an electrode with a dimension retainer according to a sixth embodiment.

FIG. 6 illustrates a process 200 of forming a solid-state battery including an electrode with a dimension retainer according to a sixth embodiment. In Step 102, a pattern is made in an anode current collector The anode current collector is formed of copper. However, it should be understood that the anode current collector may be formed of any suitable metal material, such as aluminum or copper. The anode current collector has a thickness ranging from 60 μm to 100 μm, preferably 60 μm.

In Step 202, the pattern is formed in the cathode current collector using a laser or stamping method to form a plurality of cavities in the desired pattern in a surface of the anode current collector. The pattern may be any suitable pattern, as long as the cavities cover approximately 20-30% of the surface area of the anode current collector, preferably 25% of the surface area of the anode current collector. The cavities are preferably formed in a pie-shaped pattern and do not cover a central area of the anode current collector. However, it should be understood that the cavities may be formed in a circular pattern or any other suitable pattern.

The pattern is formed such that each of the cavities has a same prescribed depth from the surface of the anode current collector. For example, each of the cavities is formed to have a prescribed depth of approximately 5 μm to 15 μm, preferably 10 μm. However, it should be understood that the cavities may have different depths from the surface of the anode current collector.

In Step 204, a polyol precursor is applied or filled in the cavities of the anode current collector. The polyol precursor may be any suitable polyol material that can be used to form a foam material.

In Step 206, the polyol precursor is grown to columns formed of a foam material using polyisocyanate. In particular, polyisocyanate is applied to the polyol precursor in the cavities of the cathode current collector, and the polyisocyanate reacts with the polyol precursor to form polyurethane. The polyurethane has a porosity of 80% or more. However, it should be understood that any suitable material may be applied in this step, as long as the material reacts with the polyol precursor to form a foam material having a porosity of at least 80%. The columns have a height of 10 μm to 30 μm, preferably 20 μm, and a diameter of approximately 1 μm to 5 μm, preferably 3 μm. The columns have a cylindrical or tubular shape, but it should be understood that the columns may have any suitable shape that gives a cushion or spring effect when the solid-state battery is under pressure.

In Step 208, an anode material is formed on the surface of the anode current collector having the columns to form an anode. For example, the anode material may be applied to the surface of the current collector such that the anode material completely surrounds the columns and the anode material has a thickness that is the same as the height of the columns extending from the surface of the anode current collector.

The anode material includes an anode active material and optionally an additive and/or a binder. The anode active material is a carbon-based anode active material that is compatible with a solid electrolyte. For example, the anode active material is formed of graphite or nanocarbon. The anode material includes approximately 90-95 percent by weight of the anode active material and five to ten percent by weight of any additive plus any binder. The anode material has a thickness of approximately 20 μm to 40 μm, preferably 30 μm.

The additive is any suitable electrically conductive additive. For example, the additive can be a carbon material, preferably a carbon black material or a carbon nanofiber having a surface area of approximately 5 $m^2$/g to 100 $m^2$/g. The binder may be any suitable electrode binder material. For example, the binder may include PTFE, PVDF, SBR, a cellulose material or any combination thereof. The binder is preferably PVDF.

In Step 210, a solid electrolyte is applied to the anode such that the solid electrolyte is in contact with both the anode material and the columns of foam material. The solid electrolyte can be any suitable lithium-ion conductive solid electrolyte. For example, the solid electrolyte can be a sulfide-based solid electrolyte, such as $Li_6PS_5Cl$, an oxide solid electrolyte, or a hybrid solid electrolyte that includes a sulfide-based solid electrolyte and a PEO based polymer. The solid electrolyte is formed to have a thickness of approximately 10 μm to 20 μm.

In Step 212, the anode and solid electrolyte are assembled with a cathode-coated current collector to form the solid-state battery. In particular, the cathode-coated current collector is assembled such that the electrolyte is disposed between the anode and the cathode-coated current collector. The cathode-coated current collector includes a cathode current collector coated with a cathode material.

The cathode current collector is formed of aluminum. However, it should be understood that the cathode current collector may be formed of any suitable metal material, such as aluminum or copper. The cathode current collector has a thickness ranging from 60 μm to 100 μm, preferably 60 μm.

The cathode material includes a cathode active material that is compatible with a solid electrolyte. For example, the cathode active material may be a lithium transition metal oxide such as NMC or lithium cobalt oxide, lithium phosphate, lithium iron phosphate or a mixture thereof.

The cathode material also includes catholyte particles, an additive and optionally a binder. For example, the cathode material may have a same composition as the cathode material 42 of the second embodiment or the cathode material 62 of the third embodiment. For example, the cathode material includes at least 80 percent by weight of the cathode active material and at least fifteen percent by weight of the catholyte particles. The cathode material also includes up to five percent by weight of the additive plus the binder. For example, the cathode material may include approximately two percent by weight of the additive and approximately three percent by weight of the binder. The weight percentage values described above are relative to a total weight of the cathode material.

Like the solid-state battery of the first, second, third and fifth embodiments, the solid-state battery of this embodiment is preferably an all-solid-state battery and can be incorporated in a vehicle, a mobile device, a laptop computer or other suitable personal electronic devices.

Figure 7A:
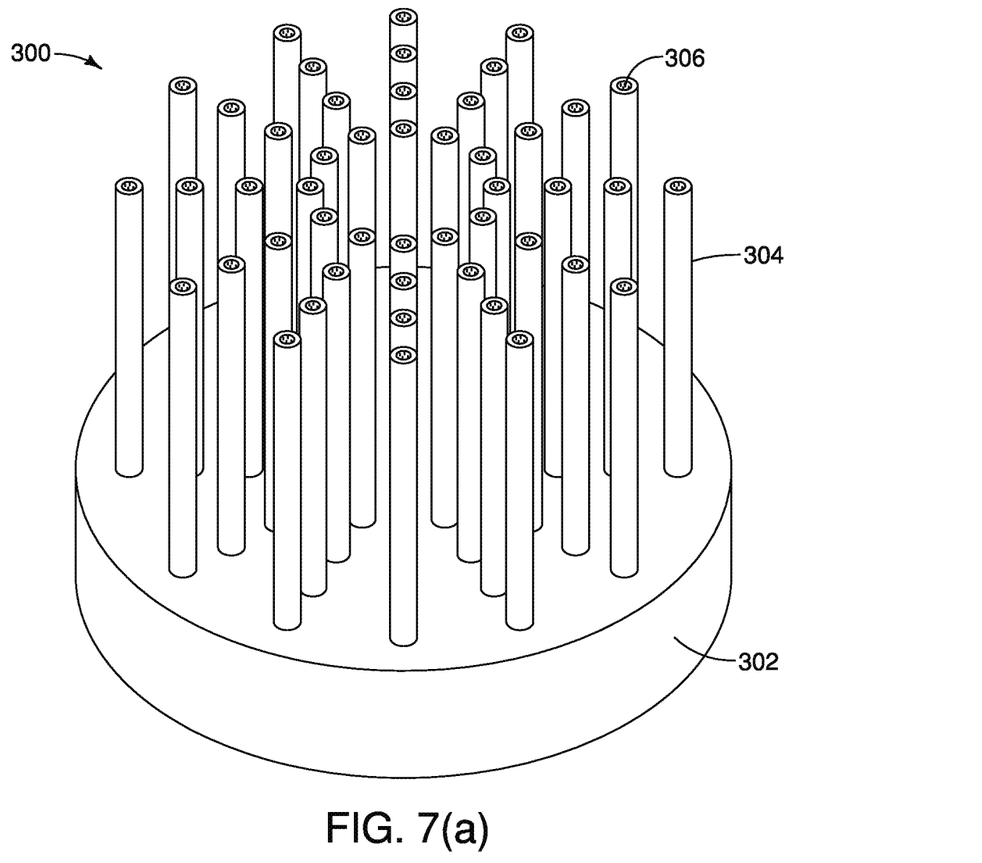
FIG. 7(a) is a perspective view of an electrode including columns according to a seventh embodiment.

FIG. 7(a) shows an electrode 300 for a solid-state battery in accordance with a seventh embodiment. The electrode 300 includes a current collector 302, a plurality of hollow columns 304 formed within and extending from a surface of the current collector 302, and an electrode active material 306 formed within the hollow columns 304. The electrode 300 can be used as a cathode or an anode in a solid-state battery, and the solid-state battery can be incorporated in a vehicle, a mobile device, a laptop computer or other suitable personal electronic device. The electrode 300 is preferably a cathode.

The current collector 302 is formed of any suitable metal material, such as aluminum or copper. The current collector 302 is preferably a cathode current collector formed of aluminum. The current collector 302 has a thickness ranging from 60 μm to 100 μm, preferably 60 μm.

The columns 304 are formed within and extending from the surface of the current collector 302. The columns 304 are hollow and are spaced apart from each other and formed in any suitable pattern, as long as the columns 304 cover approximately 20-30% of the surface area of the current collector 302, preferably 25% of the surface area of the current collector 302. The columns 304 are preferably formed in a pattern such that they do not cover a central area of the surface of the current collector 302. The columns 304 are also preferably formed in a pie-shaped pattern or a circular pattern.

Each of the hollow columns 304 has a same prescribed diameter and length extending from a first end within the surface of the current collector 302 to an opposite end. Preferably, each of the hollow columns 304 has a same prescribed length of 10 μm to 30 μm, preferably 20 μm, and a prescribed diameter of approximately 1 μm to 5 μm, preferably 3 μm. However, it should be understood that the hollow columns 304 may have different diameters and different lengths extending from the first end within the surface of the current collector 302 to the opposite end, as long as each of the columns 304 has a prescribed length of 10 μm to 30 μm, preferably 20 μm, and a prescribed diameter of approximately 1 μm to 5 μm, preferably 3 μm.

The hollow columns 304 are formed of a foam material. The foam material may be any suitable foam material that acts as a cushion. For example, the foam material has a porosity of 80% or more, is stable in lithium, and can withstand several cycles without degradation. The foam material is preferably formed of polystyrene, polyurethane, glass wool, or a mixture thereof.

The columns 304 may be formed in the current collector 302 in any suitable manner, for example using a laser to perform laser etching and form cavities in the current collector 302 and filling the cavities with the foam material or a precursor for the foam material.

The electrode active material 306 is formed of any suitable electrode active material that is compatible with a solid electrolyte. Preferably, the electrode active material 306 is a cathode active material, for example a lithium transition metal oxide such as NMC or lithium cobalt oxide, lithium phosphate, lithium iron phosphate or a mixture thereof.

Figure 7B:
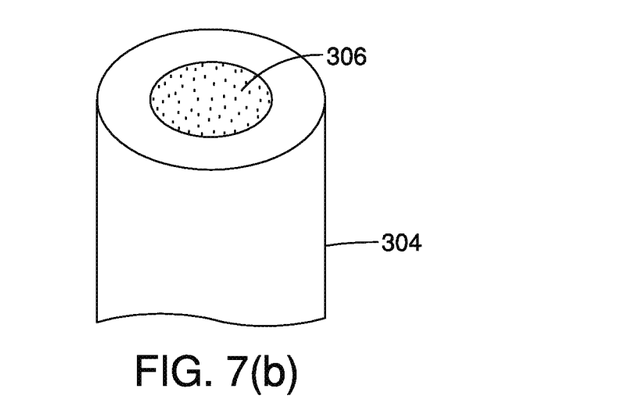
FIG. 7(b) is an exploded perspective view of the columns of FIG. 7(a).

As shown in FIG. 7(b), the electrode active material 306 is filled in the hollow columns 304. In particular, the electrode active material 306 is filled in the hollow columns 304 such that the electrode active material 306 has a width of approximately 0.5 μm to 1.5 μm, preferably 1 μm, within each of the hollow columns 304.

The volume changes in the solid-state battery can be reduced because the columns 304 formed of the foam material absorb pressure increases during charging and discharging and act as springs that can contract under pressure, for example during charging, and can re-expand when the pressure is reduced, for example during discharging.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part," "section," "portion," or "element" when used in the singular can have the dual meaning of a single part or a plurality of parts.

The terms of degree, such as "approximately" or "substantially" as used herein, mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. An electrode comprising:
   a current collector;
   at least one column formed of a foam material; and
   an electrode material disposed on the current collector, the electrode material comprising an electrode active material, and
   each of the at least one column being disposed within and extending from a surface of the current collector.

2. The electrode according to claim 1, wherein
   the current collector is formed of at least one of copper and aluminum.

3. The electrode according to claim 1, wherein
   the foam material is selected from the group consisting of: polystyrene, polyurethane and glass wool.

4. The electrode according to claim 1, wherein
   the at least one column comprises a plurality of columns formed in a pattern in the current collector, each of the plurality of columns having a same height extending from within the surface of the current collector.

5. The electrode according to claim 1, wherein
   the at least one column has a cylindrical shape.

6. The electrode according to claim 1, wherein
   the at least one column is not provided in a center region of the current collector.

7. The electrode according to claim 1, wherein
   the foam material has a porosity of 80% or more.

8. The electrode according to claim 1, wherein
   the electrode material active material is a cathode active material that comprises a lithium transition metal oxide.

9. The electrode according to claim 1, wherein
   each of the at least one column is hollow and the electrode active material is provided within each of the at least one hollow column.

10. A battery comprising
    a cathode;
    an anode; and
    an electrolyte disposed between the cathode and the anode,
    at least one of the anode and the cathode comprising:
    a current collector;
    at least one column formed of a foam material; and
    an electrode material disposed on the current collector, the electrode material comprising an electrode active material, and
    each of the at least one column being disposed within and extending from a surface of the current collector.

11. The battery according to claim 10, wherein
    the foam material is selected from the group consisting of: polystyrene, polyurethane and glass wool.

12. The battery according to claim 10, wherein
    the at least one column comprises a plurality of columns formed in a pattern in the current collector, each of the plurality of columns having a same height extending from within the surface of the current collector.

13. The battery according to claim 10, wherein
    the at least one column has a cylindrical shape.

14. The battery according to claim 10, wherein
    the foam material has a porosity of 80% or more.

15. The battery according to claim 10, wherein
    the electrolyte includes at least one of: a solid polymer electrolyte, and a solid state electrolyte comprising sulfide.

16. The battery according to claim 10, wherein
    each of the at least one column is hollow and the electrode active material is provided within each of the at least one hollow column.

17. A method of forming an electrode having a foam cushion comprising:
    forming at least one cavity in a surface of a current collector;
    applying a precursor material in each of the at least one cavity;
    growing the precursor material in each of the at least one cavity to a column that extends a prescribed height above the surface of the current collector; and
    forming an electrode active material on the surface of the current collector,
    the column being formed of a foam material.

18. The method according to claim 17, wherein
    the foam material has a porosity of 80% or more.

19. The method according to claim 17, wherein
    the foam material is selected from the group consisting of: polystyrene and polyurethane.

20. The method according to claim 17, wherein
    the column has a height of 20 µm or less.

* * * * *